United States Patent
Llorente González et al.

(10) Patent No.: US 7,748,547 B2
(45) Date of Patent: Jul. 6, 2010

(54) MOVABLE INDEPENDENT CRANE SYSTEM USED TEMPORARILY FOR MOVING OR REPLACING COMPONENTS AND MOUNTING WIND GENERATORS

(75) Inventors: Jose Ignacio Llorente González, Pamplona (ES); Jesus Zaldua Lasa, Pamplona (ES); Michael Friedrich, Pamlona (ES); Karl Aarhus, Pamplona (ES)

(73) Assignee: Gamesa Innovation & Technology, S.L., Pamplona (ES)

( * ) Notice: Subject to any disclaimer, the term of this patent is extended or adjusted under 35 U.S.C. 154(b) by 0 days.

(21) Appl. No.: 11/632,247

(22) PCT Filed: Jul. 22, 2005

(86) PCT No.: PCT/ES2005/000409

§ 371 (c)(1),
(2), (4) Date: Jun. 18, 2007

(87) PCT Pub. No.: WO2006/013222

PCT Pub. Date: Feb. 9, 2006

(65) Prior Publication Data

US 2008/0257844 A1    Oct. 23, 2008

(30) Foreign Application Priority Data

Jul. 23, 2004    (ES)    ................ 200401821

(51) Int. Cl.
*B66C 23/18*    (2006.01)
(52) U.S. Cl. ............................. 212/179; 212/175
(58) Field of Classification Search ............... 212/177, 212/179

See application file for complete search history.

(56) References Cited

U.S. PATENT DOCUMENTS 2,135,631 A * 11/1938 Amesbury ............... 212/176
2,720,694 A * 10/1955 Hines ......................... 29/467

(Continued)

FOREIGN PATENT DOCUMENTS

EP    1 101 934 A2 * 5/2001

(Continued)

*Primary Examiner*—Thomas J. Brahan
(74) *Attorney, Agent, or Firm*—Ladas and Parry LLP

(57) ABSTRACT

A movable independent crane system for moving or replacing components during maintenance operations and for mounting wind generators, including an auxiliary portal crane providing a portal structure designed to be movable around a pod about a rotation shaft. The mobile independent crane system includes raising devices being part of the crane system and designed to allow self-raising of the crane system because the mobile independent crane system is anchored to the pod through an anchoring unit and because the mobile independent crane system is designed to operate over the pod and outside the pod sides.

13 Claims, 4 Drawing Sheets

U.S. PATENT DOCUMENTS

| | | | |
|---|---|---|---|
| 4,045,866 A * | 9/1977 | Tax | 29/825 |
| 4,064,615 A * | 12/1977 | Andersson | 29/426.2 |
| 4,524,873 A * | 6/1985 | McGowan | 212/177 |
| 4,856,662 A * | 8/1989 | Marvin et al. | 212/176 |
| 5,315,159 A * | 5/1994 | Gribnau | 290/55 |
| 5,409,123 A | 4/1995 | Steiner | |
| 5,941,258 A * | 8/1999 | Flenniken et al. | 134/22.12 |
| 6,021,910 A * | 2/2000 | Franklin | 212/270 |
| 6,021,911 A | 2/2000 | Glickman et al. | |
| 6,575,685 B2 * | 6/2003 | Baxter, Sr. | 414/10 |
| 2003/0183594 A1 * | 10/2003 | Torres Martinez | 212/196 |

FOREIGN PATENT DOCUMENTS

| | | | |
|---|---|---|---|
| EP | 1 284 365 A2 * | 2/2003 | |
| JP | 9-208179 | 8/1997 | |
| JP | 11-82285 A * | 3/1999 | |
| JP | 2000-327261 | 11/2000 | |
| SU | 1606433 | 11/1990 | |
| WO | 96/10130 * | 4/1996 | |

* cited by examiner

MOVABLE INDEPENDENT CRANE SYSTEM USED TEMPORARILY FOR MOVING OR REPLACING COMPONENTS AND MOUNTING WIND GENERATORS

TECHNICAL FIELD

The invention relates to an independent mobile crane system for temporarily use on wind turbine generators (WTG), and more particularly an independent mobile crane system used for the replacement of different components i.e. rotor parts, blades, generator, gearbox etc., and during the erection of the wind turbine generator.

STATE OF THE ART

When using a crane on a wind turbine generator (WTG) today it is either for replacing parts of the turbine, during service or repair, or during the turbine erection.

For these purposes the conventional solutions of an external crane, an internal crane or a build up add-on crane in the nacelle are used.

External cranes with high lifting range and high capacity are versatile and efficient, but can be difficult to get to the site and also there can be difficulties with the soil conditions where the crane should be standing. It is not uncommon that it can be necessary to make extra foundations for the crane support legs or to prepare the access roads for example with steel plates. The height range and the capacity requirements for erection and service of turbines larger than 1 megawatt (MW) limit the number of available cranes. These factors make the use of the external cranes expensive. For offshore turbines the use of an external crane can be extremely expensive.

Internal cranes are often limited to a capacity below 1 ton (T), but can be upgraded to a higher capacity by mounting a gripwinch (Tirak) system with extra wires etc. This task can be difficult and time consuming. When using the internal crane it can be difficult to have space enough to get the components out of the turbine, and it can be necessary to remove some components to ensure a free passage due to the limited lifting height of the internal crane. Additionally items can only be lowered down via holes in the bottom of the nacelle.

An internal crane could also be build as a heavy duty system such as the patents WO-A-9610130 and EP-A-1101934 in the name of Liebherr which add excessive material and weight to the nacelle since is not a part of the load path during normal operation. This increases the costs of every turbine.

An add-on crane, which is only to be used in case of major repair or replacement, such as lifting off the rotor, replacing a gearbox, transformer or generator, is another possibility. This crane system is considered to be a better solution than the external crane and the heavy-duty internal crane, because the cost for the crane is not attributed to each turbine, since one add-on crane can be shared among several turbines. There should still be an internal crane for the most common tasks performed during service, but this crane could be limited to 500-1000 kg or whatever is needed for standard service operations.

Several different types of add-on crane systems can be envisaged. One type is an add-on crane where the crane system is hoisted up to the nacelle and assembled in the nacelle. In that case the nacelle can be prepared with attachment flanges or similar where the crane could be mounted on. Alternatively the crane could be mounted on existing flanges as the yaw gear flanges (when the yaw gears are removed). This solution is known from among others Zephyros and Enercon.

The problem is that often an external crane is needed to lift the add-on crane up on the tower top/nacelle. Alternatively the add-on crane shall be lifted up in parts with the internal crane and assembled in the nacelle. Sometimes it is necessary to install a second add-on crane for the installation of the add-on crane.

Another type is a crane unit, which is docked or attached to the nacelle. This crane could be a simple hydraulic "truck crane" or a swing crane, since these cranes can reach to a point above any position in the nacelle. The crane can then be located internally in the nacelle or externally i.e. at the side of the nacelle. Having the crane located inside the nacelle reduces the available free space in the nacelle considerably. Having the crane located on the outside of the nacelle result in introducing a torque on the nacelle or tower structure which needs to be accounted for in the design of the structures. This may lead to additional material consumption.

Furthermore such docking crane systems will in general be relative heavy and will exceed the capacity of the internal crane. Hence an external crane or a Tirak system shall be used. Instead it is considered more cost efficient if the crane system is self-hoisting, i.e. by having a wire and winch system mounted.

Another solution known is to attach the add-on crane to a platform over the tower as in EP-A-1284365 or directly attached to the tower as in EP-A-1239150.

In all of the above detailed cranes, when handling and moving different components of the wind generator in the nacelle, some problem of space can occur because there is not enough space available for the storage of said components.

It is an object of the present invention to provide an independent mobile crane system provided with an auxiliary gantry crane and a crane docking unit, which connects to suitable interface points on the primary load carrying structure of the nacelle. The system is provided with hoisting devices permitting the crane system to be self hoisting, furthermore the crane system is arranged to allow hoisting operations above the nacelle and on the outside of the nacelle ends, making the hoisting of heavy components easier.

It is a second object of the present invention to provide the system with a compartment located under the nacelle arranged to define a storage place useful in assembly or maintenance works.

These objectives are obtained by means of the invention as it is defined in claim 1; preferred embodiments of the invention are defined in the dependent claims.

DESCRIPTION OF THE INVENTION

The invention relates to an independent mobile crane system for temporarily use for moving or replacement of components during service operations and during erection of wind turbine generators (WTG). The crane system comprises an auxiliary gantry crane forming a gantry frame conformed to move around the nacelle by rotating around a rotation axis. The independent mobile crane system have hoisting devices integrated in the crane system arranged to allow the crane system to be self hoisting. Furthermore the independent mobile crane system docks to the nacelle via a docking unit and it is arranged to operate above the nacelle and on the outside of the nacelle sides.

The crane docking unit is intended to ensure that the system can be attached to the nacelle, without any potential safety hazards for humans, e.g. operations outside the nacelle or inside the nacelle with large openings in the floor.

The crane system additionally comprises a compartment located below the nacelle and integrated with the docking unit and arranged to provide a work and storage space.

The compartment shall be provided with a service hatch providing means for moving spare parts and consumables into or out of the compartment.

Thus, the compartment can be used to temporarily store tools used for service operations, and components of the wind generator. Items, which are removed temporarily, can be lowered down into the compartment, potentially providing an extra working space in the nacelle. Spare parts, which need to be installed or replaced in the turbine, can be located in the storage compartment, saving hoisting time and preventing the mentioned parts from being exposed to the external environment.

In addition installing a workbench in the compartment enables service repairs and modifications to be completed faster since there is no need to transport parts and people down to ground level.

In addition when designing the layout of the nacelle, there is no need to consider the requirement for a large service hatch in the turbine floor, since only small component are to be lowered through floor service hatches. Thus the nacelle can be made more compact and parts of the area under the floor can be utilized for other equipment in the nacelle.

The hoisting devices can be located either in the docking unit or in the compartment.

The docking unit comprises a docking system conformed to connect said docking unit to docking points in the nacelle by means of pins located on the docking unit, which acts as an interfacing and locking structure with the nacelle. Thus a secure attachment of the crane system to the nacelle is achieved.

The auxiliary gantry crane consists of two beams attached to the rotation points of the docking unit, said beams are connected by a top beam. The auxiliary gantry crane can be provided with extendable (telescopic) side beams and/or an additional jib arm structure. Then, it is possible to define the side beams length depending on each case, for example if we need to hoist heavy loads we can shorten the side beams in order to increase the hoisting capacity of the crane system.

The rotation axis of the auxiliary gantry crane is perpendicular to the nacelle axial direction and parallel with the horizontal direction, said rotation axis defines at least one rotation point, in at least one side of the crane docking unit, arranged to allow the rotation of the auxiliary gantry crane around the nacelle.

Due to the particular arrangement of the rotation axis, the hoisting of loads may be carried out in front of the nacelle or rotor, behind the rear of the nacelle or even through the nacelle by means of a service hatches (floor openings), for this reason the compartment is intended to have a roof (service hatch) which can be opened partially in order to get access to the nacelle through an opening disposed in the bottom of the nacelle.

The auxiliary gantry crane further comprises at least a crab located on the top beam displaceable in a direction parallel to said top beam, enabling the positioning of the crane hoisting point at any position inside and outside of the nacelle.

By positioning the gantry crane at different angles and additionally using the crab, three transitional degrees of freedom are obtained and any load in the turbine can be hoisted, relocated and be lowered to the ground level The independent mobile crane system can have an intermediate hoisting frame structure, which is provided with at least one anchor point for linking to an internal crane by means of a wire, and at least three anchor points for connection to the independent mobile crane system hoisting devices by means of wires. Therefore, this system is designed to ensure that all wires from the docking unit are hoisted to the nacelle in one lifting operation, instead of several lifting operations.

Thus, due to the self hoisting capacity of this independent mobile crane system, a internal crane is only needed in a first stage of the hoisting process, thus said internal crane needs only to be designed for a low maximum capacity, since it shall only hoist the intermediate hoisting frame structure, small spare parts or service consumables.

The docking points of the nacelle can in addition be used as attachment points for lifting tools when hoisting the nacelle onto the tower during turbine erection, or as attachment points for a set of wheels when the nacelle is transported either in the factory or on the road.

With this particular configuration of the independent mobile crane system, the load attached to the auxiliary gantry crane can move in the nacelle longitudinal and vertical direction and therefore the replacement of heavy nacelle components is possible without a need of a commercially available heavy-duty mobile crane, a "building crane" or a crane vessel (jack-up) with high lifting range and lifting capacity.

Additionally the system avoids the need for soil preparations and it can be considered as a service tool, which can be shared between several turbines. Hence only a fraction of its cost is attributed to each nacelle.

BRIEF DESCRIPTION OF THE DRAWINGS

A series of drawings will be very briefly described below, which aids to a better understanding of the invention and which are expressly related to an embodiment of said invention, presented as an illustrative and non-limiting example thereof.

DESCRIPTION OF A PREFERRED EMBODIMENT OF THE INVENTION

Figure 1:
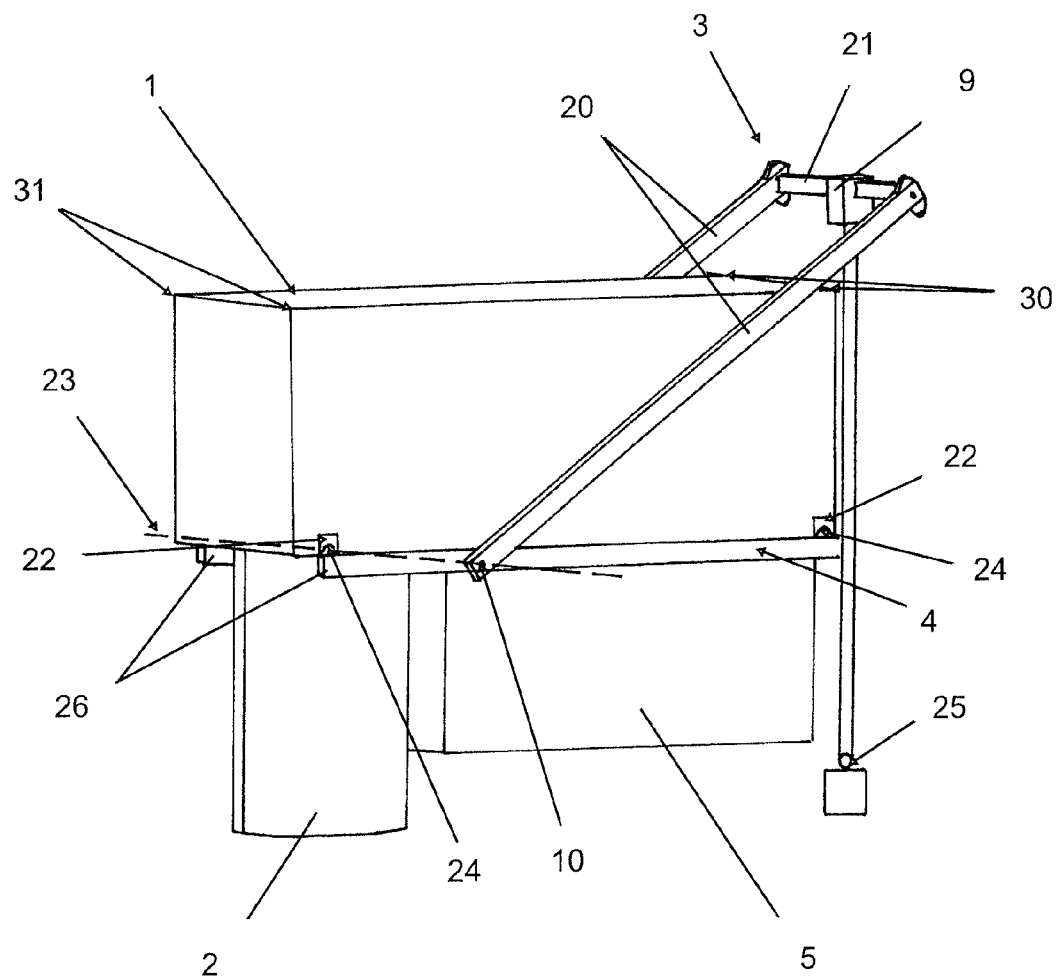
FIG. 1 shows a perspective view of a wind turbine generator and the crane system object of the present invention assembled thereto, in which the nacelle of the wind generator has been represented.
Figure 2:
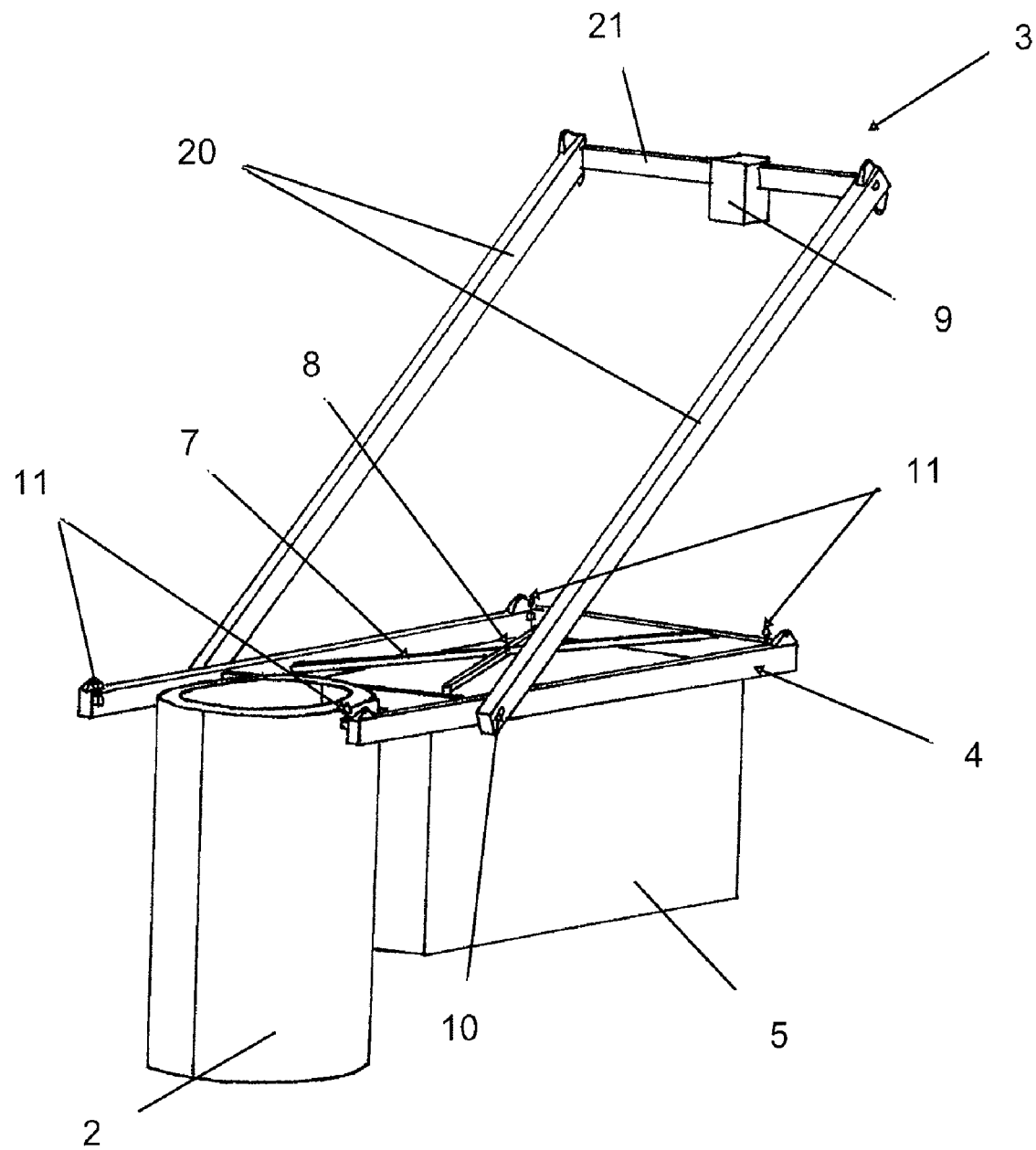
FIG. 2 shows a perspective view of a wind turbine generator and the crane system object of the present invention assembled thereto, in which the nacelle of the wind generator has not been represented.

FIGS. 1 and 2 illustrate a preferred embodiment of the invention. As we can see in FIG. 1, a wind turbine generator (WTG) comprises a nacelle (1) located at the top of a tower (2).

The independent mobile crane system of the present invention comprises an auxiliary gantry crane (3) consisting of two side beams (20) and one top beam (21) forming a gantry frame conformed to rotate around of the nacelle (1), and a crane docking unit (4) comprising a docking system conformed in such way that it acts as a nacelle (1) interfacing and locking structure via suitable docking (11) pins on the nacelle (1).

Figure 3:
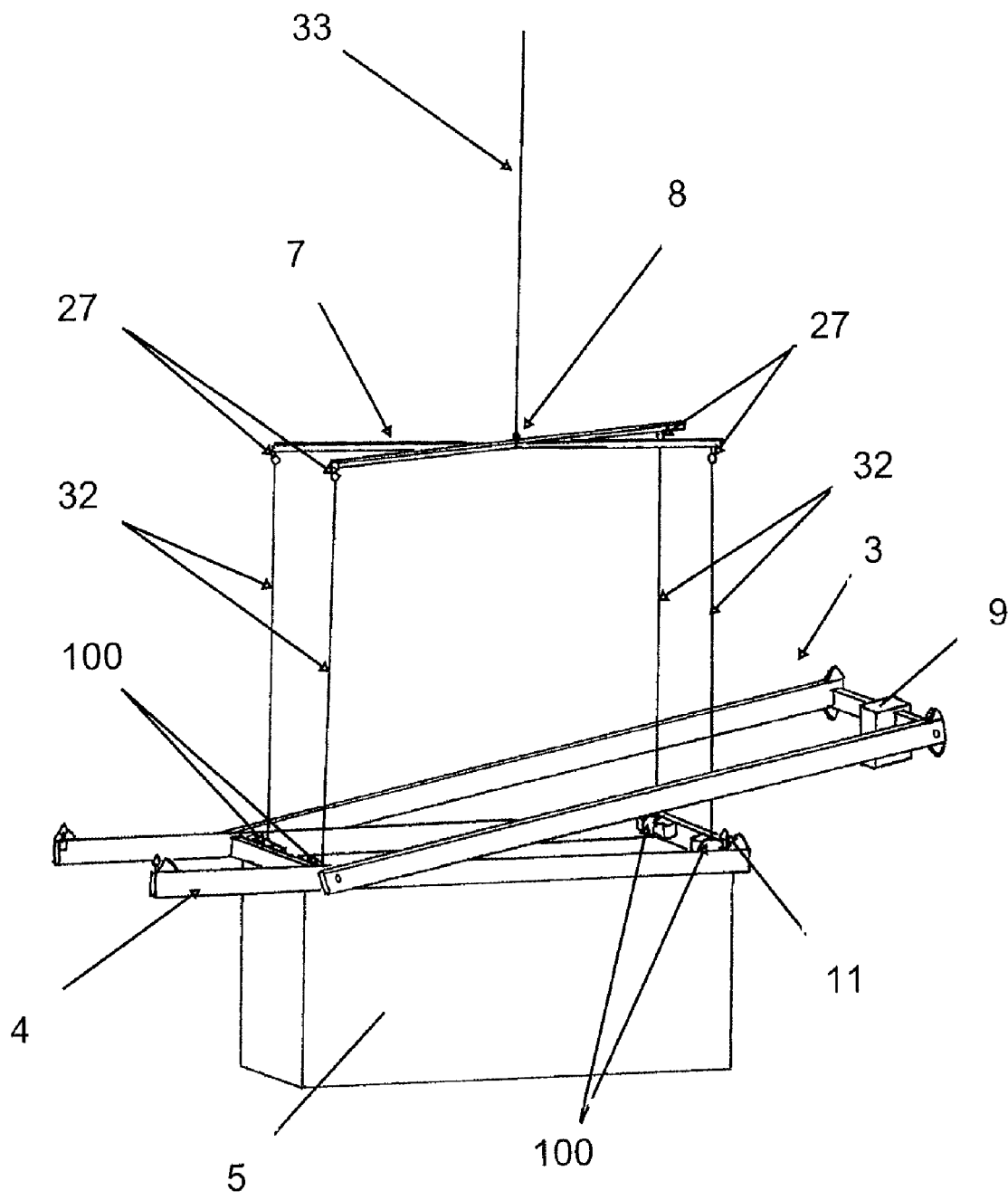
FIG. 3 shows a perspective view of the crane system during hoisting of the intermediate frame.

The independent mobile crane system have hoisting (100) devices integrated in the crane system arranged to allow the crane system to be self hoisting. The hoisting devices (100) can be located either in the docking unit (4) or in the compartment (5). In a first embodiment of the invention shown in FIG. 3 the hoisting devices (100) are located in the docking unit (4).

The independent mobile crane system docks to the nacelle (1) via a docking unit (4) and the independent mobile crane system is arranged to operate above the nacelle (1) and on the outside of the nacelle (1) sides. The docking unit (4) comprises a docking system conformed to connect said docking unit (4) to docking points in the nacelle (1) by means of pins (11) located on the docking unit (4), which acts as an interfacing and locking structure with the nacelle.

In the present embodiment of the invention, the side beams (20) of the auxiliary gantry crane (3) are placed outside the outer edges of the crane docking unit (4) and the outer edges of the nacelle (1), so the nacelle is always located between both side beams (20) during the hoisting of the turbine components.

The rotation axis (23) of the auxiliary gantry crane (3) is perpendicular to the nacelle (1) axial direction and parallel with the horizontal direction, said rotation axis (23) defines at least one rotation point (10), in at least one side (26) of the crane docking unit (4), arranged to allow the rotation of the auxiliary gantry crane (3) around the nacelle (1). In this first embodiment of the invention, the rotation axis (23) of the auxiliary gantry crane (3) is located under the nacelle (1) at the crane docking unit (4).

The side beams (20) have a length larger than the distance between their rotation points (10) and the more distant nacelle ends (30, 31) to said rotation points (10), so that the auxiliary gantry crane (3) can rotate around to the top of the nacelle (1) in such a way that any point located along the top beam (21) reaches the outside of the bottom structure of the nacelle (1).

By means of this configuration of the system, a load attached to the top beam (21) can be displaced in the nacelle longitudinal and vertical direction, and it is possible to reach any point inside of the nacelle (1), the rotor, even under the nacelle (1) and to a limited extent also outside the nacelle (1). Thus hoisting of loads may be carried out in front of the nacelle (1) or rotor, behind the rear or down through the bottom of the nacelle.

Additionally, the auxiliary gantry crane (3) can be provided with extendable side beams (20) e.g. telescopic beams, and/or an additional jib arm structure (not shown). Thus, it is possible to define the side beams length depending on particular burden features in each case.

The system further comprises a compartment (5) located below the nacelle (1), integrated with the docking unit (4) and arranged to provide a work and storage space.

The compartment (5) comprises a roof (not shown), which can be opened partially in order to gain access to the nacelle (1) through an opening (not shown) disposed in the bottom of said nacelle (1).

The compartment (5) can be used as a temporarily storage container for, e.g. for tools, spare parts, auxiliary winches, cables ... etc. In addition a workbench can be mounted in the compartment (5) in order to allow service repairs "in situ" making this type of tasks faster and preventing the mentioned parts from being exposed to the external environment.

The mentioned compartment (5) can take the form of a container, as for example a detachable truck container. For this purpose the compartment can be equipped with standard ISO attachment points enabling it to be transported on a standard ISO container trailer.

In a second embodiment of the invention (not shown) the hoisting devices (100) are attached directly to the compartment (5) so said hoisting devices are arranged to hoist, at the same time, the compartment (5) itself, the docking unit (4) and the auxiliary gantry crane (3) up to the nacelle (1). Thus the compartment (5) carries the auxiliary gantry crane (3) in order to also lift this structure to the nacelle (1), therefore an external (third party) crane is not needed.

The auxiliary gantry crane (3) further comprises at least a crab (9) located on the top beam (21) displaceable in a direction parallel to said top beam (21), enabling the positioning of the crane hoisting point (25) at any position inside and outside of the nacelle (1).

The mobility of the crab (9) enables the movement of the load with three transitional degrees of freedom, such that the hoisting point (25) can get access to any point in the nacelle (1).

Figure 4:
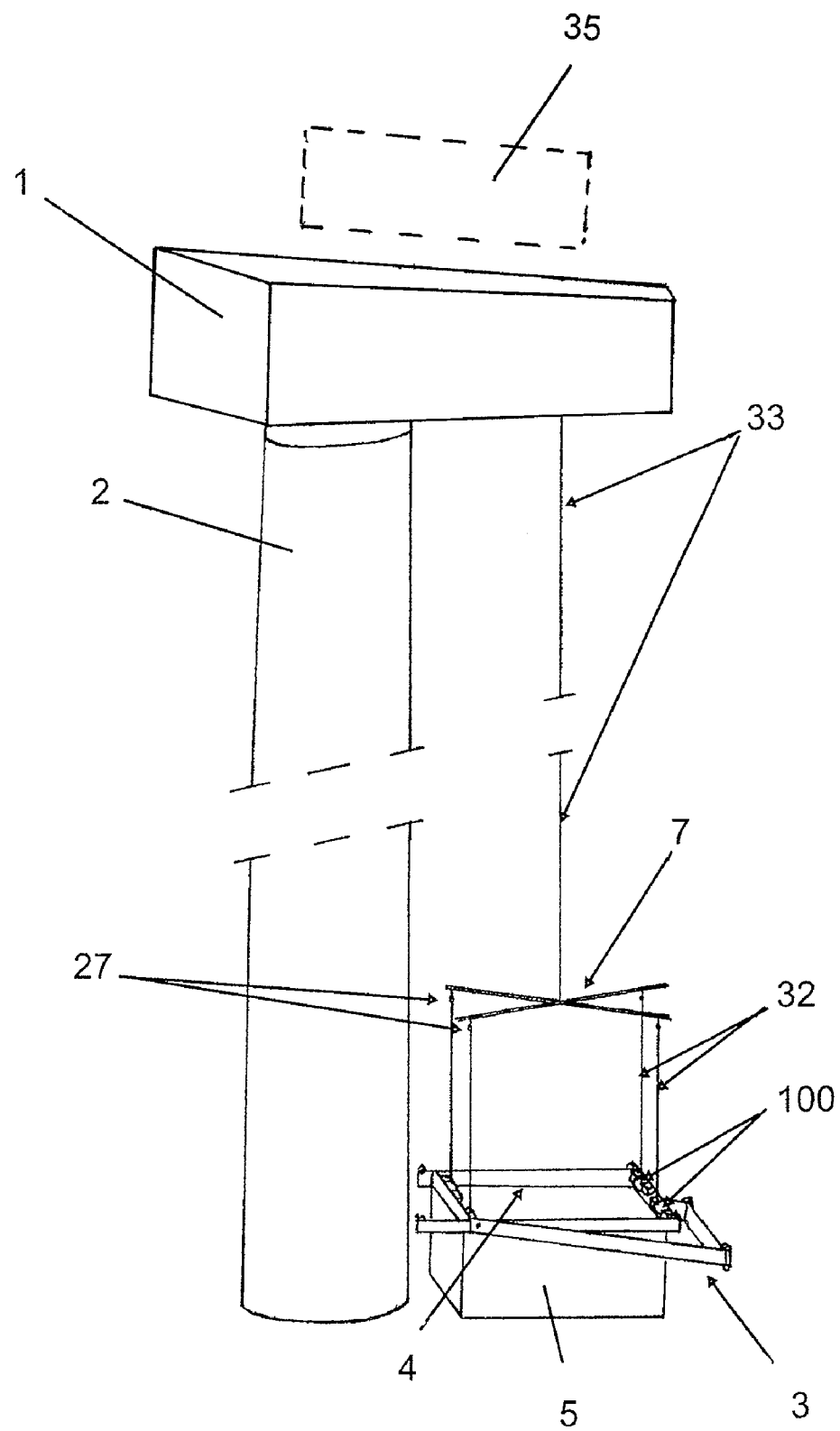
FIG. 4 shows a perspective view of the crane system during hoisting of the intermediate frame by the internal crane of the wind turbine.

The independent mobile crane system can have an intermediate hoisting frame structure (7), which is provided with at least one anchor point (8) for linking to an internal crane (35) schematically shown in FIG. 4, by means of a wire (33), and at least three anchor points (27) for connection to the independent mobile crane system hoisting devices (100) by means of wires (32).

The independent mobile crane system is assembled on the ground prior to hoisting it up to the nacelle, being transported using a standard trailer and a truck.

In a first step of the hoisting process, the wire (33) is attached to the anchor point (8) of the intermediate hoisting frame structure (7) being lifted in the direction of the nacelle (1). The crane system and the compartment (5) remain on the ground during hoisting of the intermediate frame.

In a second step, the hoisting devices (100) linked to the anchor points (27) of the intermediate hoisting frame structure (7), by means of wires (32), act in order to enable the self hoisting, at the same time, of the independent mobile crane system, that is the gantry crane (3) and the docking unit (4), and the compartment (5), up to the nacelle (1).

The intermediate hoisting frame structure (7) is foreseen to have three or more docking interfaces (not shown) with the nacelle (1) structure in order to fix said hoisting frame structure (7) while the docking unit (4), auxiliary gantry crane (3) and the compartment (5) are being hoisted to the nacelle (1).

The independent mobile crane system is provided with an angular positioning system for the auxiliary gantry crane (3), this positioning system moves the auxiliary gantry crane (3), by tilting it with respect the horizontal plane. The positioning system can comprise for example a motor system, a wire system with wire drums (24) or a hydraulic or pneumatic piston system, arranged to rotate the auxiliary gantry crane (3) around the nacelle (1).

The angular positioning system includes a control system (not shown) arranged to determine on which side of the gantry frame the cable must be kept tight.

The docking points (22) of the nacelle (1) can be used as attachment points for lifting tools when hoisting the nacelle (1) onto the tower (2) during turbine erection, or as attachment points for a set of wheels when the nacelle (1) is transported.

The invention claimed is:

1. An independent mobile crane system for temporary use for moving or replacement of components during service operations and during erection of a wind turbine, comprising:
an auxiliary gantry crane (3) forming a gantry frame conformed to rotate around a nacelle (1) according to a rotation axis (23),
wherein
the independent mobile crane system has hoisting devices (100) integrated in the crane system arranged to allow the crane system to be lifted up to the nacelle (1), the independent mobile crane system docks to the bottom of the nacelle (1) via a docking unit (4) the docking unit attached directly to the nacelle, and the independent mobile crane system is arranged to operate above the nacelle (1) and on the outside of the nacelle (1) sides.

2. The independent mobile crane system according claim 1, wherein the crane system further comprises a compartment (5) located below the nacelle (1) and integrated with the docking unit (4), and arranged to provide a work and storage space.

3. The independent mobile crane system according to claim 2, wherein the hoisting devices (100) are located in the compartment (5).

4. The independent mobile crane system according to claim 2, wherein the compartment (5) is provided with service hatch providing means for moving spare parts and consumables into or out of the compartment (5).

5. The independent mobile crane system according to claim 1, wherein the hoisting devices (100) are located in the docking unit (4).

6. The independent mobile crane system according to claim 1, wherein the docking unit (4) comprises a docking system conformed to connect the docking unit (4) to docking points (22) in the nacelle (1) by means of pins (11) located on the docking unit (4), which acts as an interfacing and locking structure with the nacelle (1).

7. The independent mobile crane system according to claim 6, wherein the docking points (22) of the nacelle (1) are used as attachment points for lifting tools when hoisting the nacelle (1) onto the tower (2) during turbine erection, or as attachment points for a set of wheels when the nacelle (1) is transported.

8. The independent mobile crane system according to claim 1, wherein the rotation axis (23) of the auxiliary gantry crane (3) is perpendicular to the nacelle (1) axial direction and parallel with the horizontal direction, the rotation axis (23) defining at least one rotation point (10), in at least one side (26) of the crane docking unit (4), arranged to allow the rotation of the auxiliary gantry crane (3) around the nacelle (1).

9. The independent mobile crane system according to claim 8, wherein the auxiliary gantry crane (3) comprises two beams (20) attached to the rotation points (10) of the docking unit (4), the beams (20) being connected by a top beam (21).

10. The independent mobile crane system according to claim 9, wherein the beams (20) are extendable.

11. The independent mobile crane system according to claim 1, wherein the auxiliary gantry crane (3) is provided with an additional jib arm structure.

12. The independent mobile crane system according to claim 1, wherein the auxiliary gantry crane (3) further comprises at least a crab (9) located on the top beam (21) displaceable in a direction parallel to the top beam (21), enabling the positioning of a crane hoisting point (25) at any position inside and outside the nacelle (1).

13. The independent mobile crane system according to claim 1, wherein the independent mobile crane system has an intermediate hoisting frame structure (7) which is provided with at least one anchor point (8) for linking to an internal crane (35) by means of a wire (33), and at least three anchor points (27) for connection to the independent mobile crane system hoisting devices (100) by means of wires (32).

* * * * *